(12) United States Patent
Lee

(10) Patent No.: US 6,795,151 B2
(45) Date of Patent: Sep. 21, 2004

(54) ARRAY SUBSTRATE FOR IN-PLANE SWITCHING MODE LIQUID CRYSTAL DISPLAY DEVICE AND MANUFACTURING METHOD THEREOF

(75) Inventor: Yun-Bok Lee, Seoul (KR)

(73) Assignee: LG. Philips LCD Co., Ltd., Seoul (KR)

(*) Notice: Subject to any disclaimer, the term of this patent is extended or adjusted under 35 U.S.C. 154(b) by 0 days.

(21) Appl. No.: 10/770,485

(22) Filed: Feb. 4, 2004

(65) Prior Publication Data

US 2004/0156005 A1 Aug. 12, 2004

Related U.S. Application Data

(62) Division of application No. 10/080,573, filed on Feb. 25, 2002, now Pat. No. 6,710,836.

(30) Foreign Application Priority Data

Feb. 26, 2001 (KR) .......................................... 2001-9748

(51) Int. Cl.[7] .................... G02F 1/1343; G02F 1/136
(52) U.S. Cl. ............................ 349/141; 349/43; 349/44
(58) Field of Search ............................ 349/43, 44, 138, 349/141

(56) References Cited

U.S. PATENT DOCUMENTS

| | | | |
|---|---|---|---|
| 5,598,285 A | 1/1997 | Kondo et al. | |
| 5,745,207 A | 4/1998 | Asada et al. | |
| 5,838,037 A | 11/1998 | Matsutani et al. | |
| 5,946,060 A | 8/1999 | Nishiki et al. | |
| 5,946,066 A | * 8/1999 | Lee et al. | ................... 349/141 |
| 5,990,987 A | 11/1999 | Tanaka | |
| 6,028,653 A | 2/2000 | Nishida | |
| 6,097,454 A | 8/2000 | Zhang et al. | |
| 6,483,566 B2 | * 11/2002 | Youn et al. | ................... 349/141 |
| 6,538,713 B1 | * 3/2003 | Yanagawa et al. | ................... 349/146 |
| 6,552,770 B2 | * 4/2003 | Yanagawa et al. | ................... 349/155 |

(List continued on next page.)

FOREIGN PATENT DOCUMENTS

| | | |
|---|---|---|
| JP | 09-005764 | 1/1997 |
| JP | 09-073101 | 3/1997 |
| JP | 09-101538 | 4/1997 |
| JP | 09-105908 | 4/1997 |

OTHER PUBLICATIONS

R. Kiefer et al.; "In–Plane Switching of Nematic Liquid Crystals"; Japan Display '92; pp. 547–550.

(List continued on next page.)

*Primary Examiner*—Tarifur R. Chowdhury
(74) *Attorney, Agent, or Firm*—McKenna Long & Aldridge LLP

(57) ABSTRACT

An array substrate for IPS-LCD includes: a gate line arranged in a first direction on a substrate; a data line arranged in a second direction perpendicular to the gate line, the data line defining a pixel region with the gate line; a plurality of common electrodes located in the pixel region and arranged in the second direction; a common line arranged in the first direction and connected to the pluarity of common electrodes; a plurality of pixel electrodes located in the pixel region and arranged in the second direction, the plurality of pixel and common electrodes having at least one bent portion and being arranged in an alternating manner with a predetermined interval between adjacent pixel and common electrodes; and a plurality of light-shielding patterns made of the same material as the data line, each light-shielding pattern disposed between one end of the pixel electrode and the intersection of the common line and common electrode.

14 Claims, 8 Drawing Sheets

U.S. PATENT DOCUMENTS 6,608,662 B1 * 8/2003 Hiroshi .................. 349/141
2002/0057411 A1 * 5/2002 Kim et al. ............... 349/141
2002/0093614 A1 * 7/2002 Moon et al. ............. 349/141

OTHER PUBLICATIONS

M. Oh–e, et al.; "Principles and Characteristics of Electro–Optical Behaviour with In–Plane Switching Mode"; Asia Display '95; pp. 577–580.

M. Ohta et al.; "Development of Super–TFT–LCDs with In–Plane Switching Display Mode"; Asia Display '95; pp. 707–710.

S. Matsumoto et al.; Display Charateristics of In–Plane Switching (IPS) LCDs and a Wide–Viewing–Angle 14.5–in. IPS TFT–LCD; Euro Display '96; pp. 445–448.

H. Wakemoto et al.; "An Advanced In–Plane Switching Mode TFT–LCD"; SID 97 Digest; pp. 929–932.

S.H. Lee et al.; High–Transmittance, Wide–Viewing–Angle Nematic Liquid Crystal Display Controlled by Fringe–Field Switching; Asia Display '98; pp. 371–374.

\* cited by examiner

ARRAY SUBSTRATE FOR IN-PLANE SWITCHING MODE LIQUID CRYSTAL DISPLAY DEVICE AND MANUFACTURING METHOD THEREOF

This application is a divisional of prior application Ser. No. 10/080,573, filed Feb. 25, 2002, now U.S. Pat. No. 6,710,836.

This application claims the benefit of Korean Patent Application No. 2001-9748, filed on Feb. 26, 2001, which is hereby incorporated by reference as if fully set forth herein.

BACKGROUND OF THE INVENTION

1. Field of the Invention

The present invention relates to a liquid crystal display device, and more particularly to a liquid crystal display device implementing in-plane switching (IPS) where an electric field to be applied to liquid crystal is generated in a plane parallel to a substrate.

2. Discussion of Related Art

A liquid crystal display (LCD) device uses the optical anisotropy and polarization properties of liquid crystal molecules to produce images. Liquid crystal molecules have a definite orientational alignment as a result of their long, thin shapes. That orientational alignment can be controlled by an applied electric field. In other words, as an applied electric field changes, so does the alignment of the liquid crystal molecules. Due to the optical anisotropy, the refraction of incident light depends on the orientational alignment of the liquid crystal molecules. Thus, by properly controlling an applied electric field, a desired light image can be produced.

While various types of liquid crystal display devices are known, active matrix LCDs having thin film transistors and pixel electrodes arranged in a matrix are probably the most common. This is because such active matrix LCDs can produce high quality images at reasonable cost.

Recently, liquid crystal display devices with light, thin, and low power consumption characteristics are used in office automation equipment and video units and the like. Driving methods for such LCDs typically include a twisted nematic (TN) mode and a super twisted nematic (STN) mode. Although TN-LCDs and STN-LCDs have been put to practical use, they have a drawback in that they have a very narrow viewing angle. In order to solve the problem of narrow viewing angle, in-plane switching liquid crystal display (IPS-LCD) devices have been proposed. The IPS-LCD devices typically include a lower substrate where a pixel electrode and a common electrode are disposed, an upper substrate having no electrode, and liquid crystals interposed between the upper and lower substrates.

A detailed explanation about operation modes of a typical IPS-LCD panel will be provided referring to FIGS. 1, 2A and 2B.

As shown in FIG. 1, upper and lower substrates 1 and 2 are spaced apart from each other, and a liquid crystal layer 3 is interposed therebetween. The upper and lower substrates 1 and 2 are called color filter substrate and array substrate, respectively. Pixel and common electrodes 4 and 5 are disposed on the lower substrate 2. The pixel and common electrodes 4 and 5 are parallel with and spaced apart from each other. The pixel and common electrodes 4 and 5 apply an electric field 6 horizontal to the liquid crystal layer 3. The liquid crystal layer 3 has a negative or positive dielectric anisotropy, and thus it is aligned parallel with or perpendicular to the horizontal electric field 6, respectively.

FIGS. 2A and 2B conceptually illustrate operation modes of a conventional IPS-LCD device. When there is no electric field between the pixel and common electrodes 4 and 5, as shown in FIG. 2A, the long axes of the liquid crystal molecules maintain an angle from a line perpendicular to the parallel pixel and common electrodes 4 and 5. Herein, the angle may be 45 degrees, for example.

On the contrary, when there is an electric field between the pixel and common electrodes 4 and 5, as shown FIG. 2B, there is an in-plane horizontal electric field 6 parallel with the surface of the lower substrate 2 between the pixel and common electrodes 4 and 5. The in-plane horizontal electric field 6 is parallel with the surface of the lower substrate 2 because the pixel and common electrodes 4 and 5 are formed on the lower substrate 2. Accordingly, the liquid crystal molecules are twisted so as to align, for example, the long axes thereof with the direction of the horizontal electric field 6, thereby the liquid crystal molecules are aligned such that the long axes thereof are parallel with the line perpendicular to the pixel and common electrodes 4 and 5.

FIG. 3 is a plan view of a lower substrate of the IPS-LCD device according to a related art. Gate lines 21 and a common line 51 are arranged parallel to each other, and data lines 31 are arranged perpendicular to the gate and common lines 21 and 51. A pair of gate and data lines 21 and 31 define a pixel region. At a crossing portion of the gate and data lines 21 and 31, a thin film transistor (TFT) 41 that is connected to the gate and data lines 21 and 31 is disposed. The common line 51 transversely crosses the pixel region, and a plurality of common electrodes 52 are disposed perpendicular to the common line 51 and connected thereto at a center of the pixel region. The plurality of common electrodes 52 are spaced apart from each other with a predetermined interval therebetween.

A plurality of pixel electrodes 62 are disposed parallel to the data line 31 and connected to a pixel connecting line 61, which is disposed above the gate line 21. Since the pixel connecting line 61 overlaps a portion of the gate line 21, the pixel connecting line 61 and the portion of the gate line 21 constitute a storage capacitor 64. Namely, the pixel connecting line 61 acts as a first electrode of the storage capacitor 64, while the portion of the gate line 21 acts as a second electrode of the storage capacitor 64.

Furthermore, one of the pixel electrodes 62 is electrically connected with the TFT 41. The plurality of common electrodes 52 and the pixel electrodes 62 are spaced apart from each other with a predetermined interval therebetween and arranged in an alternating pattern. Therefore, each common electrode 52 is parallel to an adjacent pixel electrode 62.

By the above-described structure and with additional parts such as polarizers and alignment layers, the IPS-LCD device displays images. The IPS-LCD device has wide viewing angles since the pixel and common electrodes are both placed on the lower substrate, as shown in FIG. 3. Namely, the in-plane horizontal electric field generated by the common and pixel electrodes makes it possible to provide the wide viewing angles.

However, in the IPS-LCD device, a color-shift, which depends on the viewing angle, still remains. It is already known that this color-shift is not acceptable for full color-image display. This color-shift is related to a rotational direction of the liquid crystal molecules under application of electric field when the applied voltage is greater than a threshold voltage. Moreover, this color-shift is caused by increasing or decreasing of a retardation ($\Delta n \cdot d$) of the liquid crystal layer with viewing angle.

To overcome the problem of color-shift, for example, U.S. Pat. No. 5,745,207 discloses new type IPS-LCD as shown in FIG. 4.

FIG. 4 is a plan view of an exemplary array substrate for the IPS-LCD according to the conventional art. Since the array substrate shown in FIG. 4 is similar to or somewhat the same as the substrate shown in FIG. 3, some explanation is omitted hereinafter.

Compared with the substrate of FIG. 3, although the array substrate of FIG. 4 has similar structure and configuration to that of FIG. 3, the plurality of common and pixel electrodes 52 and 62 have a herringbone shape. The plurality of common electrodes 52 are respectively angled with respect to the common line 51 and connected to each other by the common line 51. The plurality of pixel electrodes 62 are also bent at the central portion of the pixel region that is defined by the pair of the gate and data lines 21 and 31. Therefore, the pixel region is divided into two domains A and B.

From the structure and configuration shown in FIG. 4, liquid crystal molecules 71 and 72, which are positioned in the first domain A and the second domain B, respectively, are twisted in the opposite direction when the voltage is applied to the common and pixel electrodes 52 and 62. Namely, the liquid crystal molecule 71 in the first domain A turns clockwise due to the horizontal electric field generated between the common electrode 52 and the pixel electrode 62, while the liquid crystal molecule 72 in the second domain B turns counterclockwise. In the IPS-LCD of FIG. 4, since the liquid crystal molecules in the domains A and B are symmetrically rotated in opposite directions so as to compensate for the angular dependence of each other, grey level inversion and color shift are eliminated to improve the viewing angle characteristics.

However in the above-mentioned IPS-LCD, the pixel electrodes are formed in a different plane than the common electrodes. In other words, the common electrodes are formed with and in the same plane as the gate line in order to decrease the process steps of manufacture, while the pixel electrodes are formed with and in the same plane as the data line. Therefore, the common electrodes and the pixel electrodes are formed of an opaque metallic material, thereby resulting in the decrease of the aperture ratio.

SUMMARY OF THE INVENTION

Accordingly, the present invention is directed to an IPS-LCD device that substantially obviates one or more of the problems due to limitations and disadvantages of the related art.

An advantage of the present invention is to provide an array substrate for use in the IPS-LCD device having an increased aperture ratio.

Another advantage of the present invention is to provide the array substrate for use in the IPS-LCD device, which has a wide viewing angle.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

In order to achieve the above advantage, the preferred embodiment of the present invention provides an array substrate for use in an in-plane switching liquid crystal display device including: a substrate; a gate line arranged in a first direction on the substrate; a data line arranged in a second direction perpendicular to the gate line, the data line define a pixel region with the gate line; a plurality of common electrodes located in the pixel region and arranged in the second direction; a common line arranged in the first direction and connected to the plurality of common electrodes; a plurality of pixel electrodes located in the pixel region and arranged in the second direction, the plurality of pixel and common electrodes having at least one bent portion and being arranged in an alternating manner with a predetermined interval between adjacent pixel and common electrodes; and a plurality of light-shielding patterns made of the same material as the data line, each light-shielding pattern disposed between one end of the pixel electrode and the intersection of the common line and common electrode.

The above-mentioned array substrate further includes: a thin film transistor that is connected to the gate line and the dat line and includes tha gate electrode, the source electrode and the drain electrode; and a pixel connecting line that extends from the drain electrode and is connected to the plurality of pixel electrode. The pixel connecting line is disposed at the end of the common electrode and overlapped by the common electrode.

Each light-shielding pattern is disposed at an acute angle area where each common electrode forms an acute angle with the common electrode.

In another aspect, the array substrate further includes a capacitor electrode that is made of the same material as the data line and overlapped by the common line to form a storage capacitor, wherein the capacitor electrode is connected to the plurality of light-shielding patterns. One of the plurality of common electrodes extends over the adjacent pixel region. The plurality of common and pixel electrodes has a substantially zigzag shape, and the data line also has a substantially zigzag shape. A portion of the data line is overlapped by a portion of the adjacent common electrode.

In another aspect, an embodiment in accordance with the principles of the present invention provides a method of fabricating an array substrate for in-plane switching liquid crystal display device. The method includes: forming a gate line and a gate electrode on a substrate, wherein the gate electrode is connected ot the gate line, and wherein the gate line is arranged in a first direction; forming a gate insulation layer on the substrate to cover the gate line and the gate electrode; forming an active layer on the gate insulation layer and over the gate electrode; forming an ohmic contact layer on the active layer; forming a data line, a source electrode, a drain electrode, a pixel connecting line and a plurality of light-shielding patterns, thereby defining a intermediate structure, wherein the data line is arranged in a second direction perpendicular to the gate line, wherein the source electrode extends from the data line, and wherein the drain electrode extends from the pixel connecting line; forming a passivation layer over the whole surface of the substrate to cover the said intermediate structure, the passivation layer has a plurality of contact holes; and forming a common electrode and a plurality of common and pixel electrodes, wherein the common electrode is arranged in the first direction, wherein the plurality of common and pixel electrodes are arranged in the second direction and have a substantially zigzag shape, wherein the plurality of common and pixel electrodes are arranged in an alternating manner with a predetermined interval therebetween, and wherein each pixel electrode is connected the pixel connecting line through each contact hole.

Each light-shielding pattern is disposed between one end of the pixel electrode and the intersection of the common line and common electrode.

In another aspect, the method further includes forming a capacitor electrode when forming the data line. The capacitor electrode is overlapped by the common line to form a storage capacitor and connected to the plurality of light-shielding patterns. One of the light-shielding patterns is connected to one of the pixel electrodes through one of the contact holes. The data line has a substantially zigzag shape. A portion of the data line is overlapped by a portion of the adjacent common electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the accompanying drawings, like reference numerals denote like parts.

DETAILED DESCRIPTION OF THE ILLUSTRATED EMBODIMENTS

Reference will now be made in detail to embodiments of the present invention, example of which is illustrated in the accompanying drawings. Wherever possible, similar reference numbers will be used throughout the drawings to refer to the same or similar parts.

Figure 5:
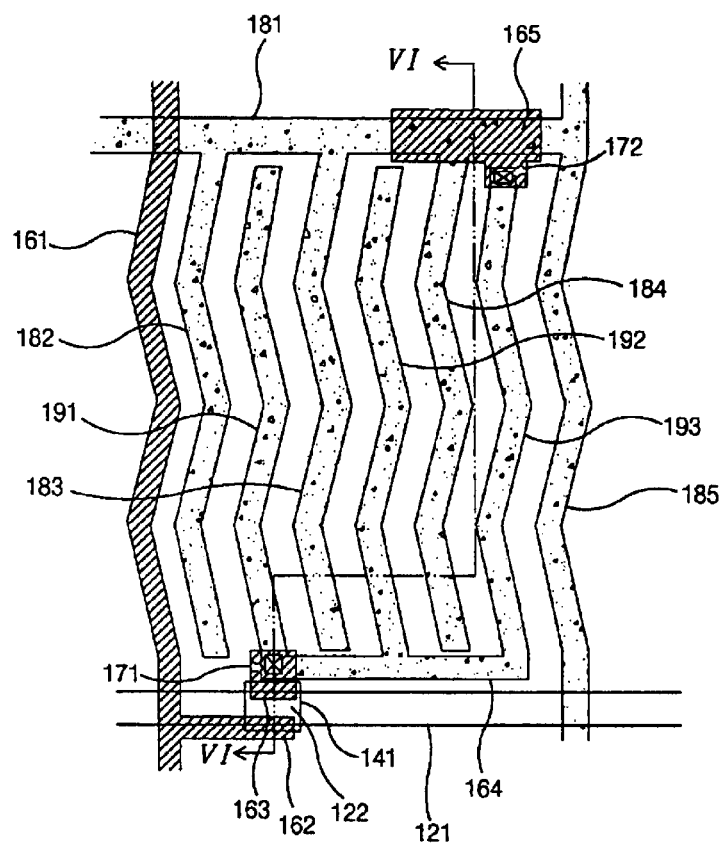
FIG. 5 is a plan view of an array substrate for IPS-LCD according to a first embodiment of the present invention.
Figure 6:
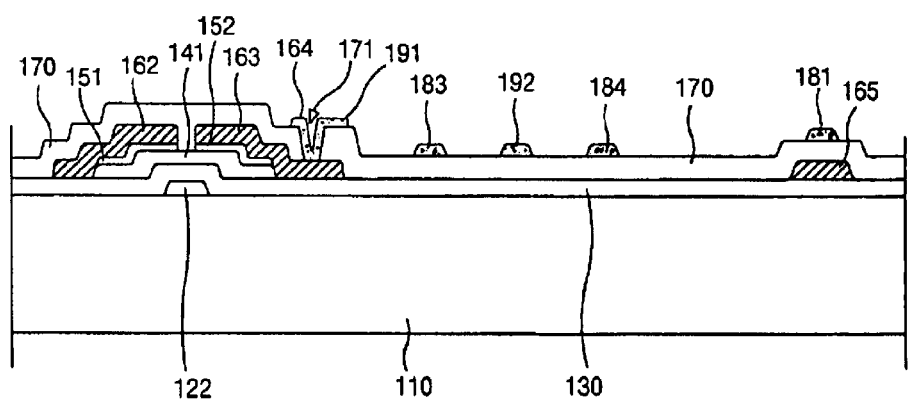
FIG. 6 is a cross-sectional view taken along a line VI—VI of FIG. 5.

FIG. 5 is a plan view of an array substrate for IPS-LCD according to a first embodiment of the present invention and FIG. 6 is a cross-sectional view taken along a line VI—VI of FIG. 5.

As shown in FIGS. 5 and 6, a gate line 121 including at least one gate electrode 122 is formed in a first direction on a substrate 110. In one embodiment of the present invention, a portion of the gate line 121 acts as a gate electrode 122. The gate line 121 is formed of a metallic material. A gate insulation layer 130, which is silicon nitride ($SiN_x$), silicon oxide ($SiO_2$) or an organic substance, is formed on the substrate 110 to cover the gate line 121. An active layer 141 of amorphous silicon is formed on the gate insulation layer 130, especially over the gate electrode 122. First and second ohmic contact layers 151 and 152 made of impurity-included amorphous silicon are formed on the active layer 141. A source electrode 162 is formed on the first ohmic contact layer 151 and a drain electrode 163 is formed on the second ohmic contact layer 152. At this time, a data line 161 and a capacitor electrode 165 are also formed on the gate insulation layer 130. The source, drain and capacitor electrodes 162, 163 and 165 and the data line 161 are made of a metallic material.

Still referring to FIGS. 5 and 6, the data line 161 is arranged in a second direction roughly perpendicular to the gate line 121 and has a substantially zigzag shape, so that the data line 161 defines a pixel region with the gate line 121. The source electrode 162 extends from the data line 161 over a portion of the gate electrode 122 and the drain electrode 163 corresponds to and is spaced apart from the source electrode 162 over another portion of the gate electrode 122. Thus, the thin film transistor that includes the gate electrode, the active layer, the ohmic contact layers and the source and drain electrodes are complete.

Although not shown in FIG. 5, but shown in FIG. 6, a passivation layer 170 is formed on the thin film transistor and on the gate insulation layer 130 to cover the capacitor electrode 165. Thereafter, portions of the passivation layer 170 are etched to form a first contact hole 171 to the drain electrode 163 and a second contact hole 172 (in FIG. 5) to the capacitor electrode 165. In other words, the first contact hole 171 exposes a portion of the drain electrode 163, and the second contact hole 172 exposes a portion of the capacitor electrode 165. A transparent conductive material, for example, indium tin oxide (ITO) or indium zinc oxide (IZO), is formed on the passivation layer 170 and then patterned to form a common line 181, first to fourth common electrodes 182 to 185, first to third pixel electrodes 191 to 193, and a pixel connecting line 164. The common line 181 is disposed in the first direction parallel with the gate line 121 and overlaps the capacitor electrode 165 to constitute a storage capacitor. The capacitor electrode 165 acts as a first electrode of the storage capacitor, and the common line 181 acts as a second electrode of the storage capacitor. The first to fourth common electrodes 182, 183, 184 and 185 extend from the common line 181 and are arranged in the second direction parallel with the data line 161. These common electrodes 182–185 also have a substantially zigzag shape, corresponding to the data line 161. Among the common electrodes, the fourth common electrode 185 extends over adjacent pixel regions. The pixel connecting line 164 is parallel with and next to the gate line 121, so the pixel connecting line 164 keeps in contact with the drain electrode 163 through the first contact hole 171. The first, second and third pixel electrodes 191, 192 and 193 extends from the pixel connecting line 164 in the second direction parallel with the data line 161. Each pixel electrode 191, 192 or 193 also has a substantially zigzag shape and corresponds to each of the pixel electrodes 182, 183, 184 and 185. Each pixel electrode is spaced apart from the adjacent common electrodes, and thus, the common electrodes and the pixel electrodes are arranged in an alternating manner with a predetermined interval between adjacent common and pixel electrodes. Among the pixel electrodes, the third pixel electrode 193 contacts the capacitor electrode 165 through the second contact hole 172 as shown in FIG. 5. According to the first embodiment of the present invention, since the common and pixel electrodes are made of the transparent conductive material in the same plane, the aperture ratio increases.

However, when forming the common and pixel electrodes in the same plane, short circuits may be caused between the common and pixel electrodes. To overcome this problem, the pixel electrodes should be sufficiently separated from the common line, and the common electrodes should be sufficiently separated from the pixel connecting line. But, when the voltage is applied to the common and pixel electrodes, a distortion of the electric field appears between the common line and the pixel electrodes and between the pixel connecting line and the common electrodes, thereby causing the misalignment of the liquid crystal molecules and disclination in those areas. Moreover, the light leakage may occur in those areas: between the common line and the pixel electrodes, and between the pixel connecting line and the common electrodes. Therefore, it is required that a black matrix on the upper substrate should shield the areas between the common line and the pixel electrodes and between the pixel connecting line and the common electrodes when the upper substrate is attached to the array substrate. At this point, the black matrix should be formed wider than those areas to be shielded, considering a margin for error in attaching the upper and lower substrates. When the upper substrate is misaligned with the array substrate, the marginal portions of black matrix compensate that misalignment to prevent the light leakage. For that reason, the black matrix is larger by about 5 micrometers, and thus, the aperture ratio decreases as much as this marginal space.

Figure 7:
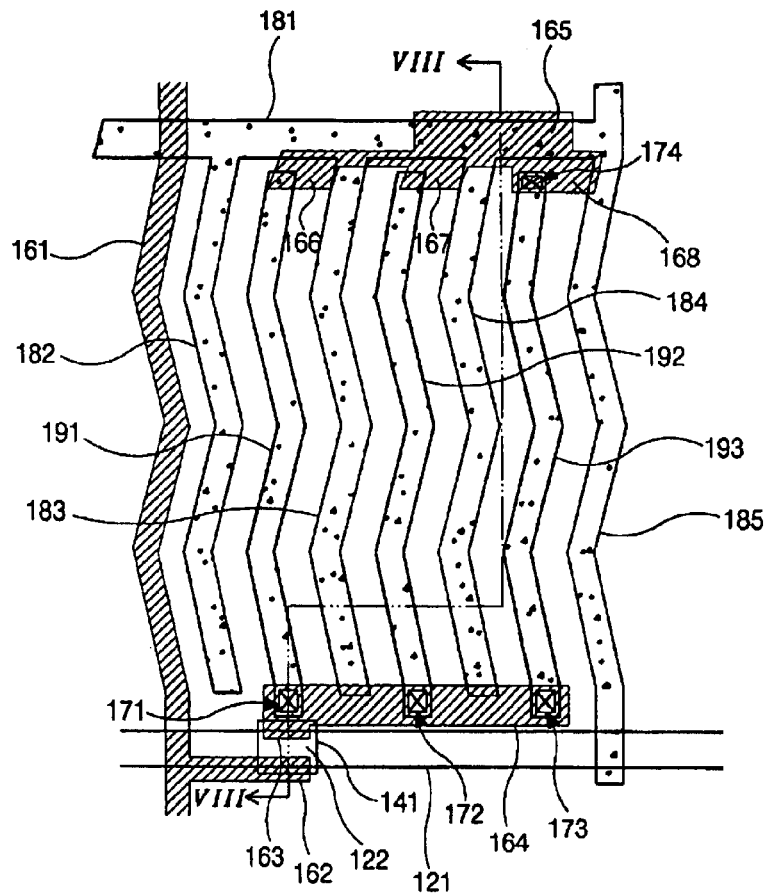
FIG. 7 is a plan view of an array substrate for IPS-LCD according to a second embodiment of the present invention.
Figure 8:
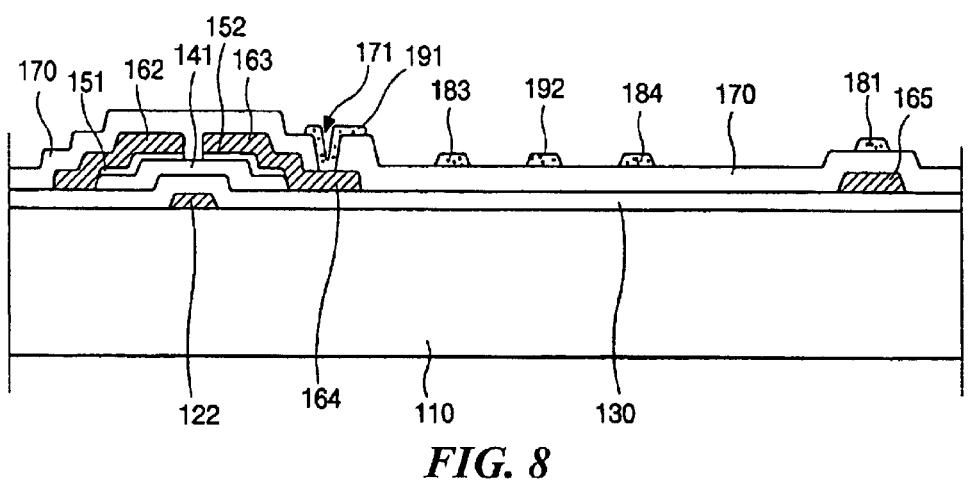
FIG. 8 is a cross-sectional view taken along a line VIII—VIII of FIG. 7.

In FIGS. 7 and 8, a second embodiment that prevents the light leakage and the decrease of aperture ratio is illustrated. FIG. 7 is a plan view of an array substrate for IPS-LCD according to the second embodiment of the present invention, and FIG. 8 is a cross-sectional view taken along a line VIII—VIII of FIG. 7.

As shown in FIGS. 7 and 8, a gate line 121 including at least one gate electrode 122 is formed in a first direction on a substrate 110. In an embodiment of the present invention, a portion of the gate line 121 acts as a gate electrode 122, but a protrusion extended from the gate line 121 can acts as a gate electrode. The substrate 110 is a glass substrate, for example, and the gate line 121 is formed of a metallic material. A gate insulation layer 130, which is silicon nitride ($SiN_x$), silicon oxide ($SiO_2$) or an organic substance, is formed on the substrate 110 to cover the gate line 121. An active layer 141 of amorphous silicon is formed on the gate insulation layer 130, especially over the gate electrode 122. First and second ohmic contact layers 151 and 152 made of impurity-included amorphous silicon are formed on the active layer 141.

Thereafter, a metallic material is formed on the gate insulation layer 130 to cover the ohmic contact layers 151 and 152 and then patterned to form a source electrode 162, a drain electrode 163, a pixel connecting line 164, a capacitor electrode 165, and first to third light-shielding patterns 166–168. The source electrode 162 is formed on the first ohmic contact layer 151 and the drain electrode 163 is formed on the second ohmic contact layer 152. The pixel connecting line is substantially parallel with and adjacent to the gate electrode 164, so that the drain electrode 163 extends from the pixel connecting line 164 over the gate electrode 122. The first, second and third light-shielding patterns 166, 167 and 168 extend from the capacitor electrode 165.

Still referring to FIGS. 7 and 8, the data line 161 is arranged in a second direction roughly perpendicular to the gate line 121 and has a substantially zigzag shape, so that the data line 161 defines a pixel region with the gate line 121. The source electrode 162 extends from the data line 161 over the gate electrode 122. The drain electrode 163 corresponds to and is spaced apart from the source electrode 162 over the gate electrode 122. Thus the thin film transistor that includes the gate electrode, the active layer, the ohmic contact layers and the source and drain electrodes are complete.

Although not shown in FIG. 7, but shown in FIG. 8, a passivation layer 170 is formed on the thin film transistor and on the gate insulation layer 130 to cover the pixel connecting line 164, the capacitor electrode 165, and the first, second and third light shielding patterns 166, 167 and 168. Thereafter, portions of the passivation layer 170 are etched to form first to fourth contact holes 171–174. The first, second and third contact holes 171, 172 and 173 expose potions of the pixel connecting line 164, and the fourth contact hole 174 exposes a portion of the third light-shielding pattern 168 that is connected to the capacitor electrode 165. Here the passivation layer 170 can be made of silicon nitride ($SiN_x$), silicon oxide ($SiO_2$) or an organic substance, like the gate insulation layer 130.

A transparent conductive material, for example, indium tin oxide (ITO) or indium zinc oxide (IZO), is formed on the passivation layer 170 and then patterned to form a common line 181, first to fourth common electrodes 182 to 185, first to third pixel electrodes 191 to 193. The common line 181 is disposed in the first direction parallel with the gate line 121 and overlaps the capacitor electrode 165 to constitute a storage capacitor. The capacitor electrode 165 acts as a first electrode of the storage capacitor, and the common line 181 acts as a second electrode of the storage capacitor. Although the capacitor electrode 165 forms the storage capacitor with the common line 181 in the second embodiment shown in FIGS. 7 and 8, it can constitute the storage capacitor with the gate line instead of the common line 181. The first to fourth common electrodes 182, 183, 184 and 185 extend from the common line 181 and are arranged in the second direction substantially parallel with the data line 161. These common electrodes 182–185 also have a substantially zigzag shape, corresponding the data line 161. Among the common electrodes, the fourth common electrode 185 extends over the adjacent pixel regions.

The first, second and third pixel electrodes 191, 192 and 193 are arranged in the second direction substantially parallel with the data line 161. Each pixel electrode 191, 192 or 193 also has a substantially zigzag shape and corresponds to each of the common electrodes 182, 183, 184 and 185. Each pixel electrode 191, 192 and 193 is spaced apart from the adjacent common electrodes, and thus, the common electrodes and the pixel electrodes are arranged in an alternating manner with a predetermined interval between adjacent common and pixel electrodes. The first, second and third pixel electrodes 191, 192 and 193 contact the pixel connecting line 164 through the first, second and third contacts holes 171, 172 and 173, respectively. Among the pixel electrodes, the third pixel electrode 193 electrically contacts the capacitor electrode 165 through the third contact hole 174 as shown in FIG. 7. According to the second embodiment of the present invention, since the common and pixel electrodes are made of the transparent conductive material in the same plane, the aperture ratio increases.

Figure 1:
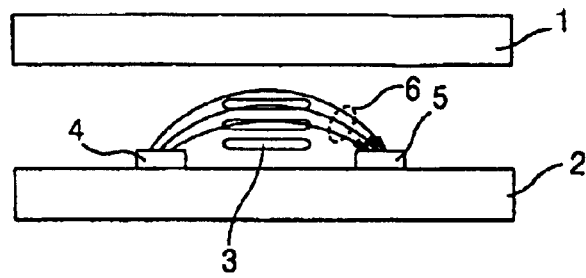
FIG. 1 is a conceptual cross-sectional view illustrating a typical IPS-LCD device.
Figure 2A:
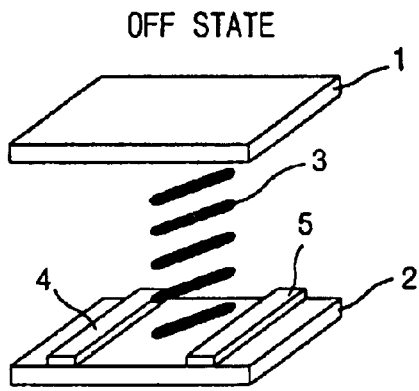
FIG. 2A is a perspective view illustrating "off state" of the IPS-LCD device of FIG. 1.
Figure 2B:
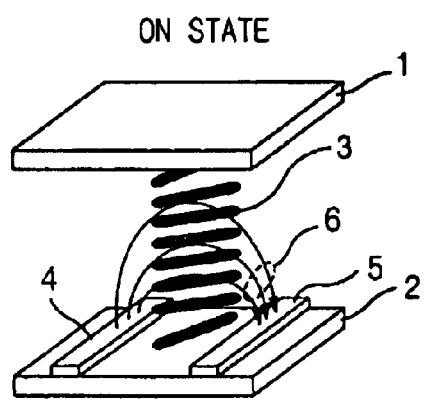
FIG. 2B is a perspective view illustrating "on state" of the IPS-LCD device of FIG. 1.
Figure 3:
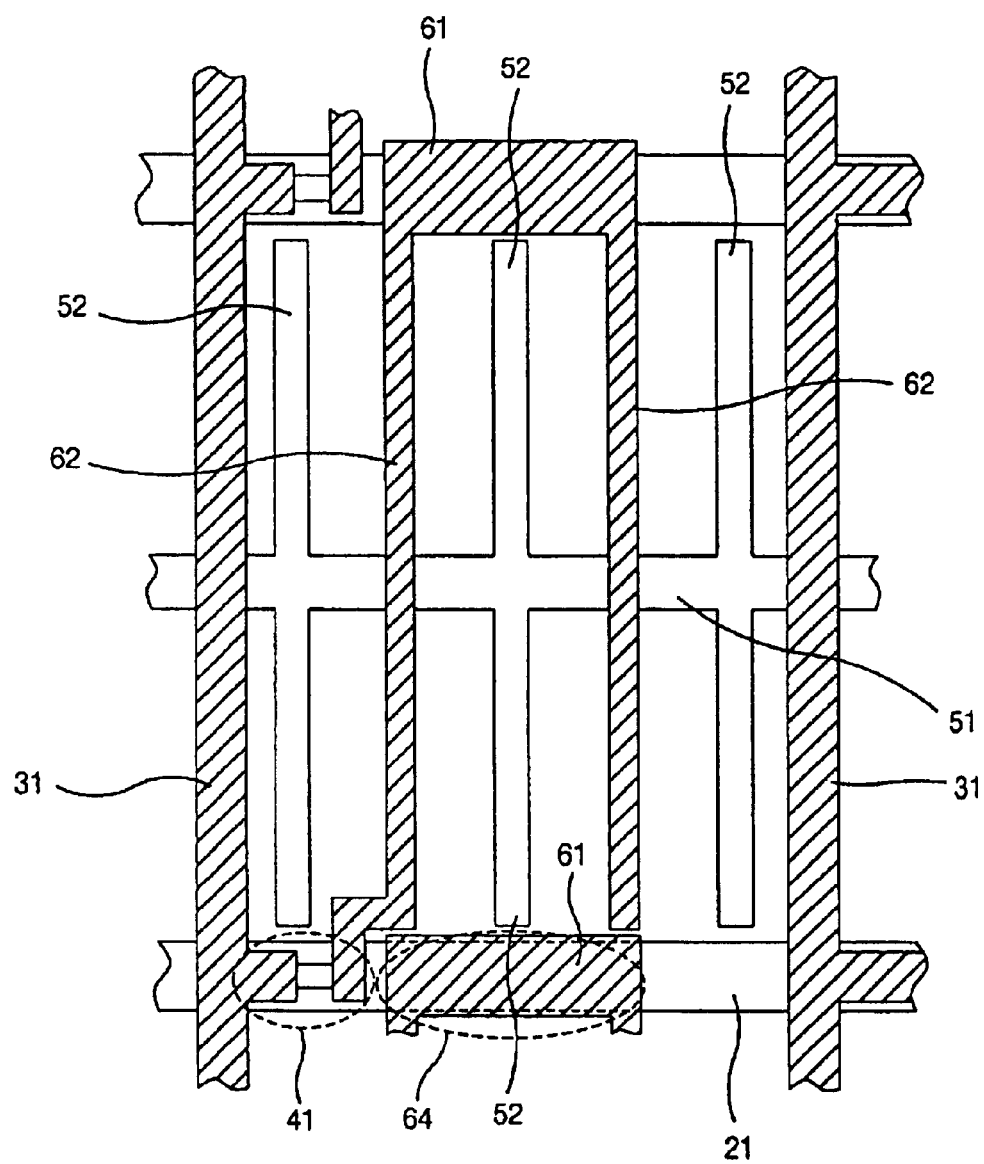
FIG. 3 is a plan view of a lower substrate of the IPS-LCD device according to a related art.
Figure 4:
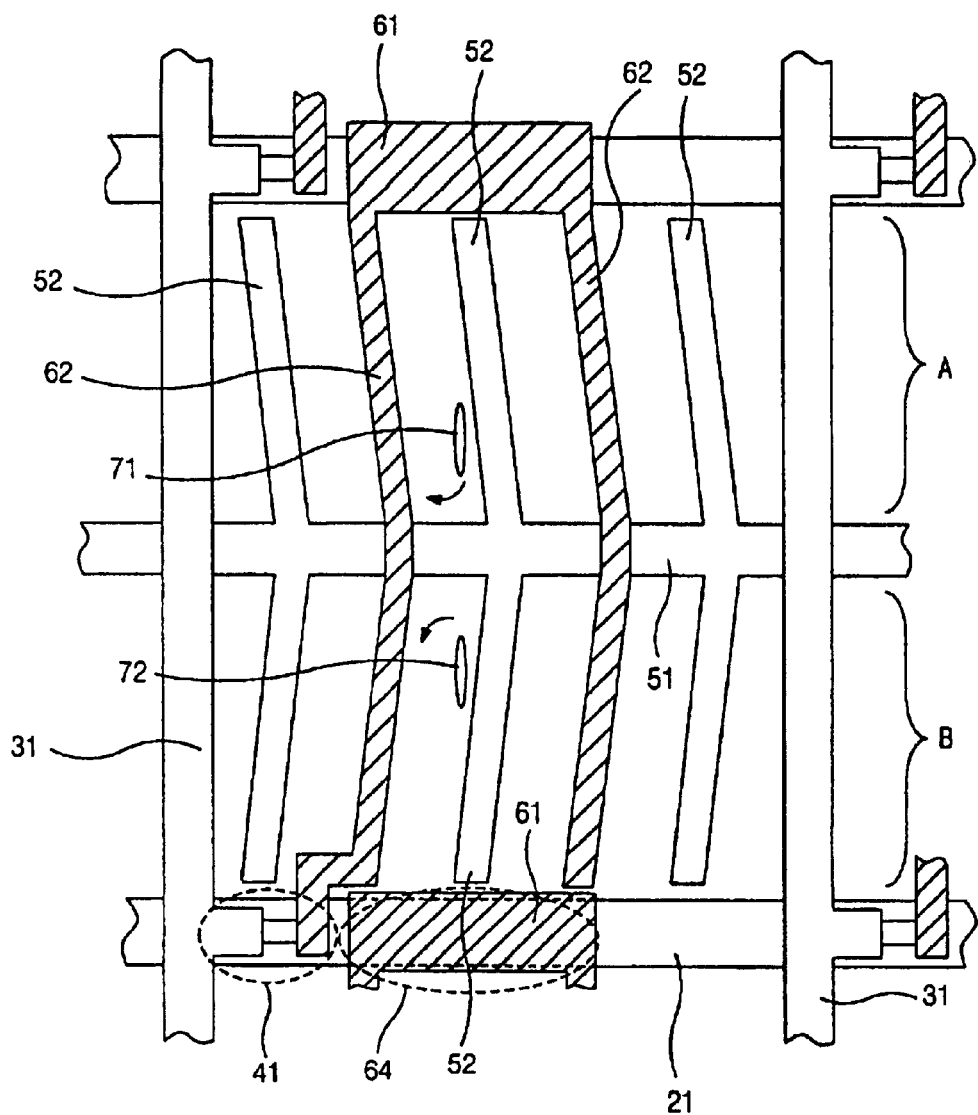
FIG. 4 is a plan view of an exemplary array substrate for IPS-LCD according to the conventional art.

In FIG. 7, although the common electrodes 182–185, the pixel electrodes 191–193, and the data line 161 have a substantially zigzag shape with a plurality of bent portions therein, those electrodes 182–185 and 191–193 can have the herringbone shape like the conventional art shown in FIG. 4, and the data line 161 can be shaped like a straight line.

In the second embodiment shown in FIGS. 7 and 8, the pixel connecting line 164 that is made of the opaque metallic material shields the bottom portions of the second and third common electrodes 183 and 184. In the context of FIG. 7, top portions of the common electrodes 182–185, i.e., the portion of the common electrodes connecting to the common electrode 181, form acute angles with the common line 181 on their left sides, respectively. On the contrary, the top portions of the common electrodes 182–185 form obtuse angles with the common line 181 on their right sides, respectively. On the left sides, i.e., acute angle areas, the electric field is distorted and disclination occurs. Namely, the liquid crystal molecules, which are located in the areas between the top portion of the pixel electrode and the left side of the intersection of the common line and electrode, are misaligned. Therefore, the first, second and third light-shielding patterns 166, 167 and 168 need to be located therein in order to prevent the light leakage.

Meanwhile, on the right sides of the intersections of the common line and electrode, i.e., the obtuse angle areas, the liquid crystal molecules are aligned properly in accordance with the properly generated electric field. Thus, the light-shielding patterns are not required there because the light leakage does not occur.

In the second embodiment of the present invention, since the first, second and third light-shielding patterns 166, 167 and 168 are connected to the capacitor electrode 165, it is an advantage that the capacity of storage capacitor increases. Further in the second embodiment, the light-shielding patterns 166, 167 and 168 can be separated from the capacitor electrode 165 in order to prevent a short-circuit between the capacitor electrode 165 and the common electrodes 182–185.

According to the second embodiment of the present invention, since the pixel connecting line 164 and the light-shielding patterns 166, 167 and 168 are formed of the opaque metallic material and positioned in the bottom and top portions of the common electrodes, respectively, the light leakage occurring in those areas are prevented. Therefore, the black matrix on the upper substrate does need to be wide enough to overlap those areas and prevents the light leakage. For that reason, the aperture ratio does not decrease.

Figure 9A:
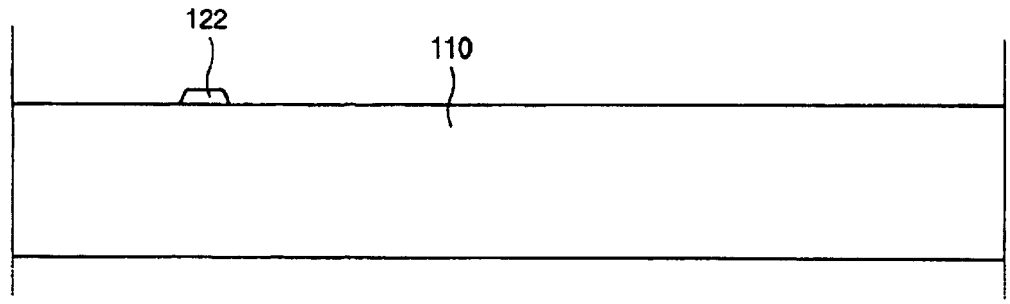
FIGS. 9A to 9E are cross-sectional view illustrating the steps of forming the array substrate of FIG. 8.

FIGS. 9A to 9E are cross-sectional views illustrating the steps of forming the array substrate of FIG. 8. As shown in FIG. 9A, a first metal layer is formed on the transparent substrate 110, such as a glass, and then, the first metal layer is subsequently patterned to form a gate electrode 122 that is a portion of the gate line 121 of FIG. 7. Here the first metal is selected from a group consisting of chromium (Cr), aluminum (Al), molybdenum (Mo), tantalum (Ta), tungsten (W), antimony (Sb) and an alloy thereof. Although not shown in FIG. 9A, the gate electrode 122 can have a double-layered structure.

Figure 9B:
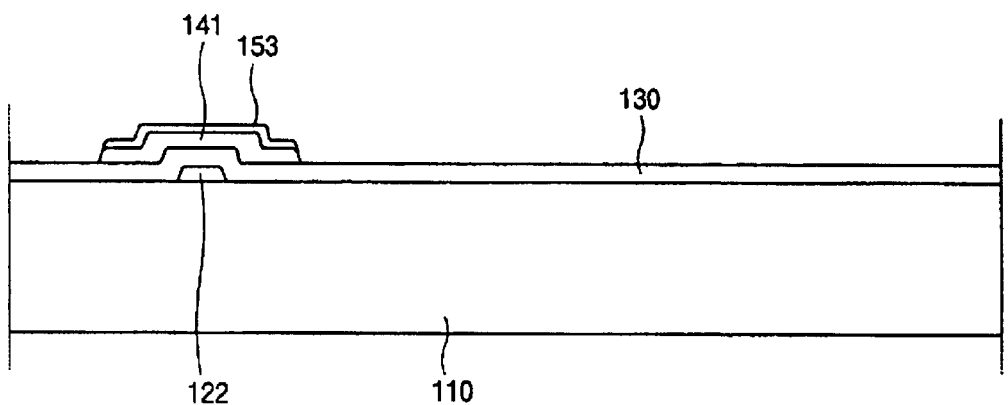

In FIG. 9B, the gate insulation layer 130 is formed on a surface of the substrate 110 to cover the patterned first metal layer. As mentioned before, the gate insulation layer 130 is an inorganic material, such as silicon nitride ($SiN_X$) or silicon oxide ($SiO_2$), or an organic material, such as benzocyclobutene (BCB) or acryl-based resin, for example. Then, a pure amorphous silicon (a-Si:H) and a doped amorphous silicon ($n^+$a-Si:H) are sequentially formed upon the gate insulation layer 130, and then patterned to form the active layer 141 and a extrinsic semiconductor layer 153.

Figure 9C:
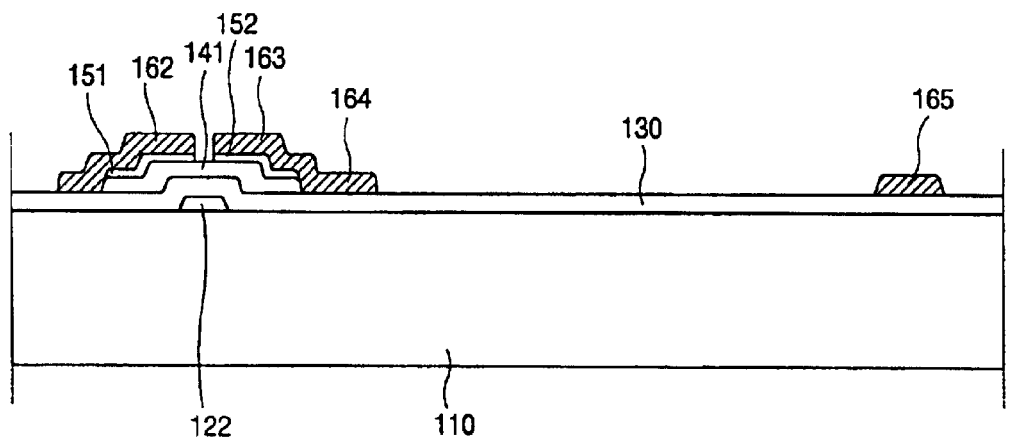

Now in FIG. 9C, a second metal layer is formed upon the extrinsic semiconductor layer 153 and upon the gate insulation layer 130 by depositing a metallic material, such as molybdenum (Mo), chromium (Cr), tungsten (W), aluminum (Al) or an alloy thereof. The second metal layer is subsequently patterned to form the source electrode 162, the drain electrode 163, the pixel connecting line 164 and the capacitor electrode 165. Although not shown in FIG. 9C, the data line 161 and the first to third light-shielding patterns 166 to 168 (in FIG. 7) are formed at the time of patterning the second metal layer. The source electrode 162 extends from the data line 161 of FIG. 7 and overlaps an end porton of the gate electrode 122. The drain electrode 163 is spaced apart from the source electrode 162 and overlaps an opposite end portion of the gate electrode 122. Thus, the thin film transistor is complete. The pixel connecting line 164 is connected to the drain electrode 163 and the first, second and third light-shielding patterns 166, 167 and 168 (not shown) are connected to the capacitor electrode 165. A portion of the extrinsic semiconductor layer 153 disposed upon the active layer 141 are etched using the source and drain electrodes 162 and 163 as masks, thereby forming a channel region in the active layer 141 and forming the first and second ohmic contact layers 151 and 152.

Figure 9D:
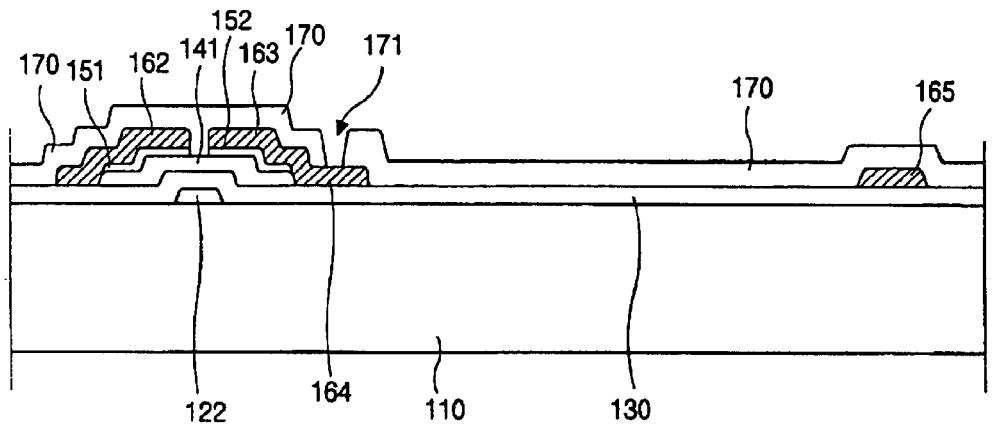

Referring to FIG. 9D, the passivation layer 170 is formed on the patterned second metal layer and on the gate insulation layer 130. The passivation layer 170 is subsequently patterned to form the first contact hole 171 to the pixel connection line 164. At this time, the second and third contact holes 172 and 173, which expose the portions of the pixel connecting line 164, and the fourth contact hole 174 (not shown) which exposes the portion of the third light-shielding pattern 168 (not shown) connected to the capacitor electrode 165, are formed as illustrated in FIG. 7.

Figure 9E:
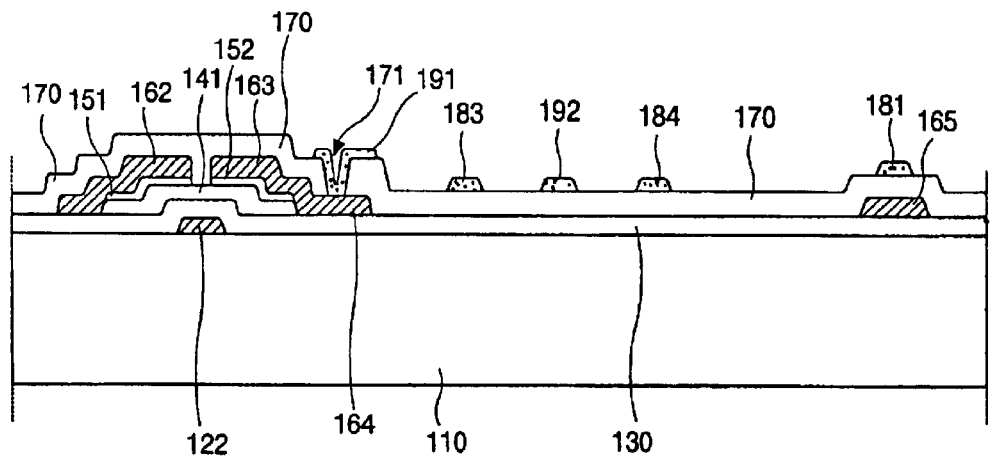

In FIG. 9E, which corresponds to FIG. 8, a transparent conductive material is deposited on the patterned passivation layer 170. The transparent conductive material commonly includes indium tin oxide (ITO) or indium zinc oxide (IZO). Thereafter, the transparent conductive material is patterned to form the common line, the second and third common electrodes 183 and 184, and the first and second pixel electrodes 191 and 192. Although not shown in FIG. 9E, but shown in FIG. 7, the first and fourth common electrodes 182 and 185 and the third pixel electrode 193 are also formed when patterning the transparent conductive material. The first and second pixel electrodes 191 and 192 contact the pixel connecting line 164 through the first and second contact hole 171 and 172, respectively. The third pixel electrode 193 contacts both the pixel connecting line 164 and the third light-shielding pattern 168 through the third and fourth contact hole 173 and 174, respectively. In the present invention, it is possible that the opaque metallic material is substituted for the transparent conductive material. The common electrodes and the pixel electrodes have a substantially zigzag shape, as shown in FIG. 7, but these electrodes can have a herringbone shape.

According to the second embodiment described before, the pixel connecting line, which is formed with the data line, prevents light leakage at one end portions of the common electrodes, and the light-shielding patterns, which are also formed with the data line, prevent the light leakage at the opposite end portions of the common electrodes. Thus, it is possible to prevent the disclination without increasing the process steps of forming the array substrate. Because the black matrix upon the upper substrate can have a more narrow width, it is possible to obtain the improved aperture ratio.

Figure 10:
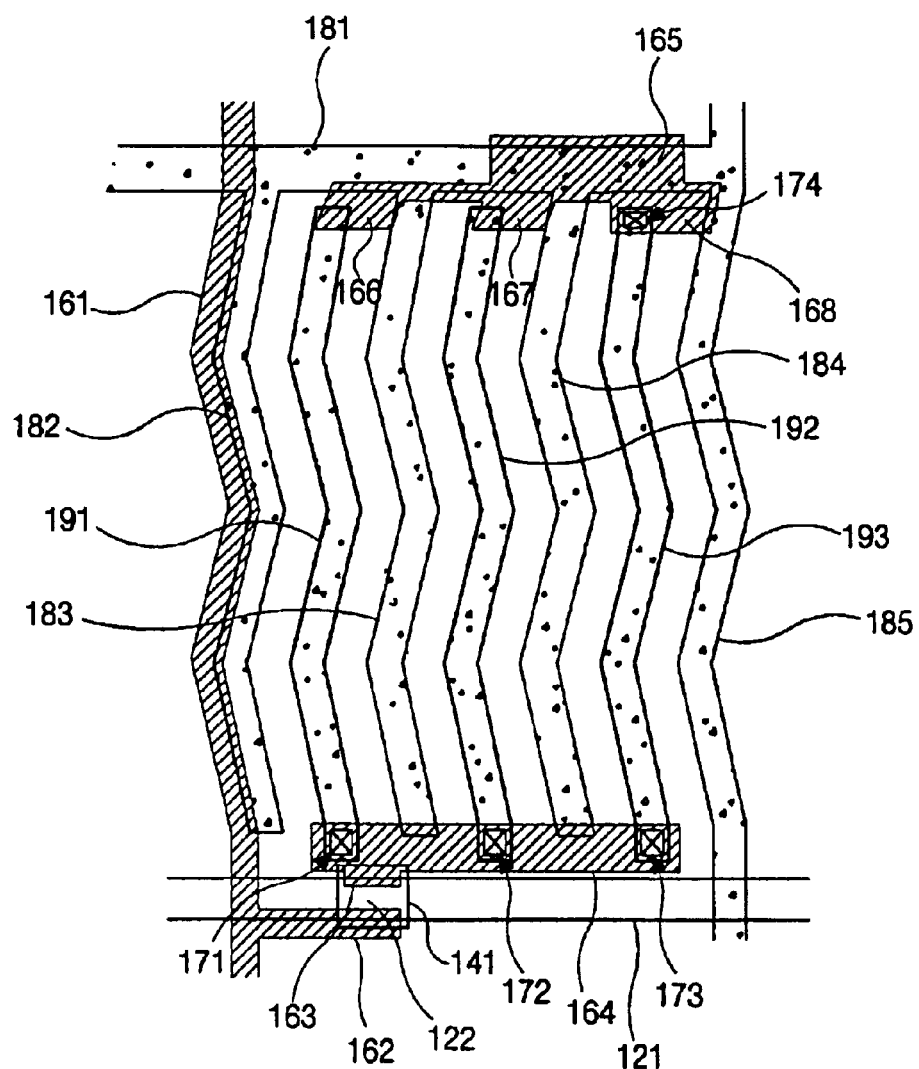
FIG. 10 is a plan view of an array substrate for IPS-LCD according to a third embodiment of the present invention.

FIG. 10 is a plan view of an array substrate for IPS-LCD according to a third embodiment of the present invention. Since the array substrate of FIG. 10 has the almost same structure and configuration as that of FIG. 7, some of explanation is omitted hereinafter.

As shown in FIG. 10, the data line 161, which is arranged in a longitudinal direction and has a substantially zigzag shape, somewhat overlaps a portion of the first common electrode 182. In the second embodiment illustrated in FIG. 7, the data line 161 and the first common electrode 182 are spaced apart from each other and the area between the data line 161 and the first common electrode 182 does not display the images. To solve this problem of non-display, the first common electrode 182 overlaps a portion of the data line 161 in the third embodiment of the present invention. Therefore, the display area is broadened and the aperture ratio increases.

Accordingly in the present invention as illustrated hereinbefore, the aperture ratio is raised because the common and pixel electrodes are formed of the transparent conductive material. Furthermore, since the pixel connecting line and the light-shielding patterned that is made of the opaque material are formed at both end portions of the common electrodes, the light leakage is prevented. For that reason, since the black matrix upon the upper substrate does not need to be wider for preventing the light leakage, the aperture ratio is further improved.

It will be apparent to those skilled in the art that various modifications and variation can be made in the array substrate of the present invention without departing from the spirit or scope of the invention. Thus, it is intended that the present invention cover the modifications and variations of this invention provided they come within the scope of the appended claims and their equivalents.

What is claimed is:

1. A method of forming an array substrate for an in-plane switching liquid crystal display device, comprising:

forming a gate line and a gate electrode on a substrate;

forming a gate insulation layer on the substrate to cover the gate line and the gate electrode;

forming a semiconductor layer on the gate insulation layer;

forming a source electrode and a drain electrode on the semiconductor layer and simultaneously forming a data line, a pixel connecting line and a plurality of light-shielding patterns on the gate insulation layer, thereby defining an intermediate structure;

forming a passivation layer over the substrate to cover the intermediate structure, the passivation layer having a plurality of contact holes; and forming a common line and a plurality of common and pixel electrodes on the passivation layer, the plurality of common and pixel electrodes having a substantially zigzag shape.

2. The method of claim 1, wherein each light-shielding pattern is disposed between one end of the pixel electrode and the intersection of the common line and at least common electrode.

3. The method of claim 1, further comprising forming a capacitor electrode when forming the data line.

4. The method of claim 3, wherein the capacitor electrode is overlapped by the common line.

5. The method of claim 4, wherein the capacitor electrode is connected to the plurality of light-shielding patterns.

6. The method of claim 1, wherein one of the light-shielding patterns is connected to one of the pixel electrodes through one of the contact holes.

7. The method of claim 1, wherein the data line has a substantially zigzag shape.

8. The method of claim 1, wherein a portion of the data line is overlapped by a portion of the adjacent common electrode.

9. The method of claim 1, wherein the semiconductor layer sequentially includes an active layer and an ohmic contact layer over the gate electrode.

10. The method of claim 1, wherein the gate line is arranged in a first direction and is connected to the gate electrode.

11. The method of claim 1, wherein the data line is arranged in a second direction perpendicular to the gate line.

12. The method of claim 11, wherein the source electrode extends from the data line.

13. The method of claim 1, wherein the drain electrode extends from the pixel connecting line.

14. The method of claim 1, wherein each pixel electrode is connected to the pixel connecting line through each contact hole.

* * * * *